(12) United States Patent
Tanaka et al.

(10) Patent No.: US 11,461,708 B2
(45) Date of Patent: Oct. 4, 2022

(54) INFORMATION PROCESSING APPARATUS, METHOD, AND SYSTEM

(71) Applicant: Toyota Jidosha Kabushiki Kaisha, Toyota (JP)

(72) Inventors: Yurika Tanaka, Yokosuka (JP); Daiki Kaneichi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/132,441

(22) Filed: Dec. 23, 2020

(65) Prior Publication Data

US 2021/0192398 A1 Jun. 24, 2021

(30) Foreign Application Priority Data

Dec. 24, 2019 (JP) .............................. JP2019-232940

(51) Int. Cl.
| | | |
|---|---|---|
| *G06Q 10/02* | (2012.01) | |
| *G08G 1/00* | (2006.01) | |
| *G06N 20/00* | (2019.01) | |
| *G06Q 50/30* | (2012.01) | |
| *G10L 15/22* | (2006.01) | |

(52) U.S. Cl.
CPC ............. *G06Q 10/02* (2013.01); *G06N 20/00* (2019.01); *G06Q 50/30* (2013.01); *G08G 1/202* (2013.01); *G10L 15/22* (2013.01)

(58) Field of Classification Search
CPC .... G06Q 10/02; G06Q 10/04; G06Q 10/0631; G06Q 50/30; G08G 1/202; G06N 20/00; G10L 15/22

USPC ............................................................ 705/5
See application file for complete search history.

(56) References Cited

U.S. PATENT DOCUMENTS

| | | | |
|---|---|---|---|
| 10,685,297 B2* | 6/2020 | Meyer | G06Q 50/14 |
| 11,086,858 B1* | 8/2021 | Koukoumidis | H04L 51/02 |
| 2008/0228496 A1* | 9/2008 | Yu | G10L 15/24 704/E21.001 |
| 2014/0244712 A1* | 8/2014 | Walters | G06Q 10/10 709/202 |
| 2017/0147951 A1* | 5/2017 | Meyer | G06Q 50/14 |
| 2017/0193627 A1 | 7/2017 | Urmson et al. | |
| 2020/0043480 A1* | 2/2020 | Shen | G10L 15/22 |
| 2020/0098271 A1* | 3/2020 | Beaurepaire | G08G 1/14 |
| 2020/0175429 A1* | 6/2020 | Beaurepaire | G06Q 50/30 |

FOREIGN PATENT DOCUMENTS

| | | | | |
|---|---|---|---|---|
| EP | 2211336 A1 * | 7/2010 | | G06F 3/0237 |
| JP | 2019-505899 A | 2/2019 | | |

OTHER PUBLICATIONS

Zhao, Xilei. "Prediction and behavioral analysis of travel mode choice: A comparison of machine learning and logit models". https://www.sciencedirect.com/science/article/pii/S2214367X19302455 (Year: 2020).*

* cited by examiner

*Primary Examiner* — Shannon S Campbell
*Assistant Examiner* — Lisa Ma
(74) *Attorney, Agent, or Firm* — Dinsmore & Shohl LLP

(57) ABSTRACT

There is provided a controller that executes: calculating, based on information about behavior of a user, likelihood about future movement of the user; and outputting information about a service for the movement of the user based on the calculated likelihood.

20 Claims, 12 Drawing Sheets

INFORMATION PROCESSING APPARATUS, METHOD, AND SYSTEM

CROSS REFERENCE TO RELATED APPLICATION

This application claims the benefit of Japanese Patent Application No. 2019-232940, filed on Dec. 24, 2019, which is hereby incorporated by reference herein in its entirety.

BACKGROUND

Technical Field

The present disclosure relates to an information processing apparatus, an information processing method and a system.

Description of the Related Art

A technique is known in which data of a user's timetable and boarding history is accumulated to grasp a behavioral pattern, and an available vehicle is dispatched when there is a possibility that the user goes out (see, for example, Patent document 1).

CITATION LIST

Patent Document

[Patent document 1] Japanese Unexamined Patent Application Publication (Translation of PCT Application) No. 2019-505899

SUMMARY

Since it is difficult to grasp a user's schedule if the user does not input the schedule to a timetable, the user is forced to input the schedule. Therefore, it is troublesome for the user. An object of the present disclosure is to cause convenience for the user at the time of movement to be improved.

One of aspects of the present disclosure is an information processing apparatus comprising a controller, the controller being configured to execute:

calculating, based on information about behavior of a user, likelihood about future movement of the user; and outputting information about a service for the movement of the user based on the calculated likelihood.

One of aspects of the present disclosure is an information processing method, wherein a computer executes:

calculating, based on information about behavior of a user, likelihood about future movement of the user; and outputting information about a service for the movement of the user based on the calculated likelihood.

One of aspects of the present disclosure is a system comprising:

an input apparatus configured to detect behavior of a user;

an information processing apparatus comprising a controller, the controller being configured to execute:

calculating, based on the behavior of the user detected by the input apparatus, likelihood about future movement of the user; and outputting information about a service for the movement of the user based on the calculated likelihood; and an output apparatus configured to output a notification based on the information about the service outputted by the controller, to the user.

Further, another aspect of the present disclosure is a program causing a computer to execute the above information processing method or a non-transitory recording medium that stores the program.

According to the present disclosure, it is possible to cause user convenience at the time of movement to be improved.

DESCRIPTION OF THE EMBODIMENTS

Figure 1:
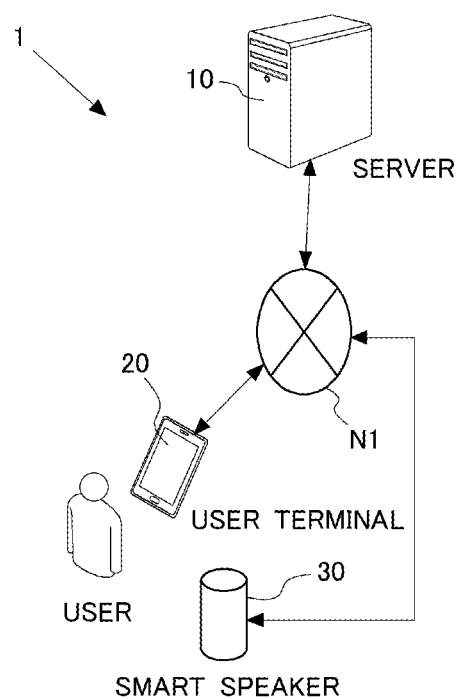
FIG. 1 is a diagram illustrating a schematic configuration of a dispatch system according to an embodiment.

In an embodiment, when a user goes out, a service for movement is provided for the user. For example, in a system that arranges a vehicle for the user (hereinafter also referred to as a dispatch system), it is conceivable to calculate likelihood about future movement of the user based on behavior of the user before the movement and perform dispatch based on the calculated likelihood. The vehicle may be, for example, a manned taxi, an unmanned taxi, a manned ride-sharing vehicle or an unmanned ride-sharing vehicle. For the unmanned taxi or the unmanned ride-sharing vehicle, a vehicle capable of autonomous traveling can be used. For example, it is conceivable that, when the user uses a vehicle at the time of going out from home, he uses this service. Note that, for movement from a building other than home, such as a commercial facility and an office building, in addition to going out from home, the same is also conceivable. The user can use the vehicle at least for a part of a process until he reaches a destination. For example, he may move by the vehicle from home to a station and move in a train from the station to the destination. Note that the user may go out, riding on something to ride other than a vehicle (for example, a bicycle) from home.

Time for the vehicle to go to the user's home to pick up the user can be decided based on the behavior of the user. The behavior of the user includes, for example, the user inputting characters to a terminal, the user making an utterance to a microphone, the user having a conversation with another user, and the like. The users' conversation may be acquired, for example, by a microphone arranged in a building.

However, there may be a case where a correlation between the behavior that the user performs before going out and the user's going out is low. Therefore, a judgment based on certainty (hereinafter also referred to as likelihood) of the user going out is made. Here, for example, by performing machine learning for the behavior of the user, likelihood corresponding to the behavior of the user can be calculated. Note that the calculation of the likelihood based on the behavior of the user is not limited to calculation by machine learning. For example, a rate of the number of times of the behavior of the user before going out to the number of times the user actually goes out may be calculated as the likelihood. The likelihood may be certainty about when, where and by which means the user moves. Further, the likelihood may be probability that the user goes out.

If the likelihood of the user going out is high to some extent, it can be thought that a possibility of the user actually going out is high. Therefore, for example, if the likelihood is equal to or above a threshold, a controller outputs information about a service for movement of the user. For example, information about the user's address and time when the user goes out may be transmitted to a taxi operator so that a taxi arrives at the time when the user goes out. Furthermore, for example, the user may be notified of time when the taxi arrives.

Note that, though description will be made on a service for dispatching a taxi capable of autonomous traveling to the user's home in the embodiment below, the present disclosure is not limited thereto but can be used, for example, for a service for delivering a bicycle to a user's home when the bicycle is lent to the user.

The embodiment of the present disclosure will be described below based on drawings. A configuration of the embodiment below is an example, and the present disclosure is not limited to the configuration of the embodiment.

First Embodiment

FIG. 1 is a diagram illustrating a schematic configuration of a dispatch system 1 according to the embodiment. The dispatch system 1 includes, for example, a server 10, a user terminal 20 and a smart speaker 30. The server 10 is an example of an information processing apparatus. A user in FIG. 1 is a user who operates the user terminal 20 and a user who uses a vehicle (a taxi) arranged by the dispatch system 1. Information corresponding to content that the user inputs to the user terminal 20 is transmitted to the server 10 from the user terminal 20. A plurality of users can exist, and a plurality of user terminals 20 exist according to the number of users. Further, information corresponding to an utterance of each user is transmitted from the smart speaker 30 to the server 10. A plurality of smart speakers 30 may be provided in the user's home. Note that the user terminal 20 may be provided with a microphone to transmit an utterance of the user to the server 10.

The dispatch system 1 illustrated in FIG. 1 is, for example, a system in which dispatch is performed according to content the user has inputted to the user terminal 20 or content of an utterance of the user acquired by the smart speaker 30. The server 10 calculates likelihood of the user going out, based on an input to the user terminal 20 or an input to the smart speaker 30. Then, when the likelihood is equal to or above a threshold, the server 10 arranges a vehicle for the user. This threshold is an example of a first threshold and a second threshold. The threshold may be decided in consideration of user convenience and costs of a taxi operator.

The server 10, the user terminal 20 and the smart speaker 30 are mutually connected via a network N1. The network N1 is, for example, a global public communication network such as the Internet, and a WAN (wide area network) and other communication networks may be adopted. Further, the network N1 may include a telephone communication network for mobile phones and the like and a wireless communication network such as Wi-Fi (registered trademark).

(Hardware Configuration)

Figure 2:
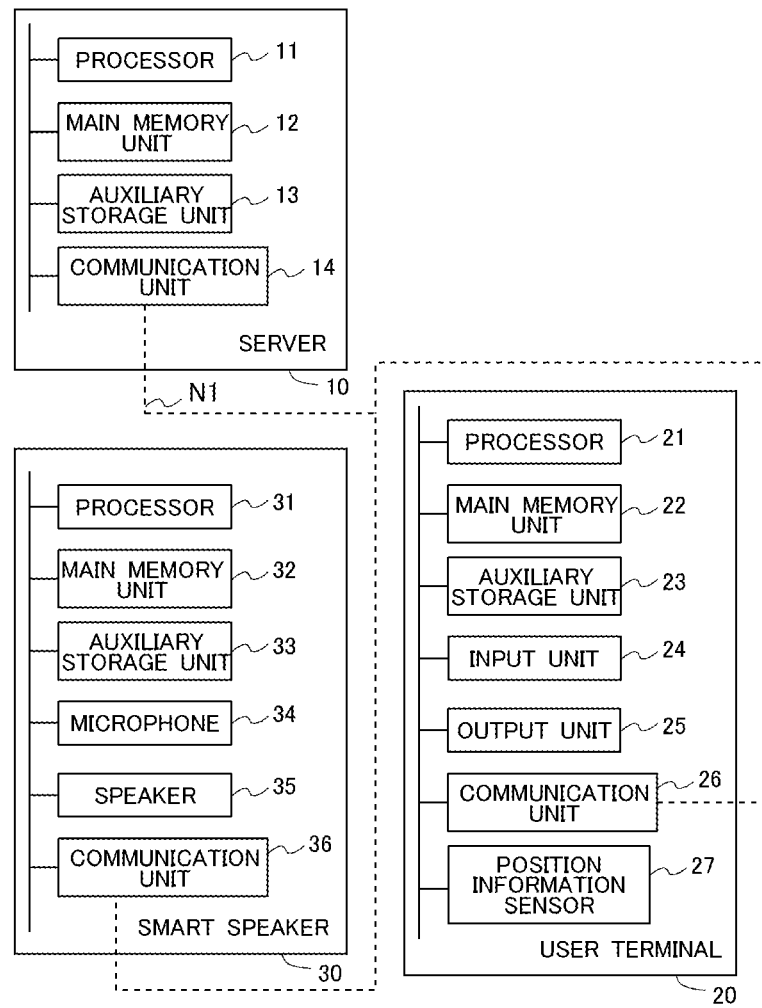
FIG. 2 is a block diagram schematically illustrating an example of a configuration of each of a server, a user terminal and a smart speaker constituting the dispatch system according to the embodiment.

Hardware configurations of the server 10, the user terminal 20 and the smart speaker 30 will be described based on FIG. 2. FIG. 2 is a block diagram schematically illustrating an example of a configuration of each of the server 10, the user terminal 20 and the smart speaker 30 constituting the dispatch system 1 according to the present embodiment. Note that the user terminal 20 and the smart speaker 30 are examples of an input apparatus and an output apparatus, respectively. Further, both of the user terminal 20 and the smart speaker 30 are examples of a user terminal.

The server 10 has a configuration of a general computer. The server 10 has a processor 11, a main memory unit 12, an auxiliary storage unit 13 and a communication unit 14. These are mutually connected via a bus.

The processor 11 is a CPU (central processing unit), a DSP (digital signal processor) or the like. The processor 11 controls the server 10 to perform various information processing operations. The main memory unit 12 is a RAM (random access memory), a ROM (read-only memory) and the like. The auxiliary storage unit 13 is an EPROM (erasable programmable ROM), a hard disk drive (HDD), a removable medium and the like. In the auxiliary storage unit 13, an operating system (OS), various kinds of programs, various kinds of tables and the like are stored. The processor 11 loads a program stored in the auxiliary storage unit 13 to a work area of the main memory unit 12 and executes the program, and each of components and the like is controlled through the execution of the program. Thereby, the server 10 realizes functions that meet predetermined purposes. The main memory unit 12 and the auxiliary storage unit 13 are computer-readable recording media. Note that the server 10 may be a single computer or may be such that is constituted by cooperation of a plurality of computers. The information stored in the auxiliary storage unit 13 may be stored in the main memory unit 12. Information stored in the main memory unit 12 may be stored in the auxiliary storage unit 13.

The communication unit 14 performs communication with the user terminal 20 and the smart speaker 30 via the network N1. The communication unit 14 is, for example, a LAN (local area network) interface board and a wireless communication circuit for wireless communication. The LAN interface board and the wireless communication circuit are connected to the network N1.

Note that, though it is possible to cause a series of processes executed by the server 10 to be executed by hardware, it is also possible to cause the series of processes to be executed by software. The hardware configuration of the server 10 is not limited to that illustrated in FIG. 2.

Next, the user terminal 20 will be described. The user terminal 20 is, for example, a small-size computer such as a smartphone, a mobile phone, a tablet terminal, a personal information terminal, a wearable computer (such as a smartwatch) and a personal computer (PC). The user terminal 20 has a processor 21, a main memory unit 22, an auxiliary storage unit 23, an input unit 24, an output unit 25, a communication unit 26 and a position information sensor 27. These are mutually connected via a bus. Since the processor 21, main memory unit 22 and auxiliary storage unit 23 of the user terminal 20 are similar to the processor 11, main memory unit 12 and auxiliary storage unit 13 of the server 10, description will be omitted.

The input unit 24 accepts an input operation performed by the user and is, for example, a touch panel, push buttons, a mouse, a keyboard, a microphone or the like. The output unit 25 presents information to the user and is, for example, an LCD (liquid crystal display), an EL (electroluminescence) panel, a speaker, a lamp or the like. The input unit 24 and the output unit 25 may be configured as one touch panel display.

The communication unit 26 connects the user terminal 20 to the network N1. The communication unit 26 is, for example, a circuit for performing communication with other apparatuses (for example, the server 10 and the like) via the network N1 using a mobile communication service (for example, a telephone communication network such as 5G (5th Generation), 4G (4th Generation), 3G (3rd Generation) and LTE (Long Term Evolution)) or a wireless communication network such as Wi-Fi (registered trademark).

The position information sensor 27 acquires position information (for example, latitude and longitude) about the user terminal 20 in a predetermined cycle. The position information sensor 27 is, for example, a GPS (Global Positioning System) receiving unit, a wireless communication unit or the like. Information acquired by the position information sensor 27 is, for example, recorded to the auxiliary storage unit 23 or the like and transmitted to the server 10.

Next, the smart speaker 30 will be described. The smart speaker 30 has a processor 31, a main memory unit 32, an auxiliary storage unit 33, a microphone 34, a speaker 35 and a communication unit 36. These are mutually connected via a bus. Since the processor 31, main memory unit 32, auxiliary storage unit 33 and communication unit 36 of the smart speaker 30 are similar to the processor 21, main memory unit 22, auxiliary storage unit 23 and communication unit 26 of the user terminal 20, description will be omitted.

The microphone 34 is a device that converts an utterance of the user to an electrical signal. The speaker 35 is a device that converts an electrical signal acquired from the server 10 to sound. Configurations of the microphone 34 and the speaker 35 are not limited. The utterance of the user converted to the electric signal by the microphone 34 is transmitted to the server 10 via the communication unit 36.

(Outline of Server)

Figure 3:
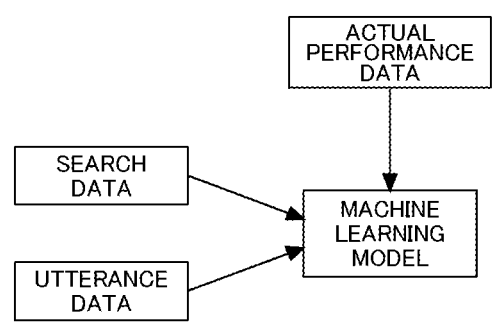
FIG. 3 is a diagram illustrating an outline of machine learning.
Figure 4:
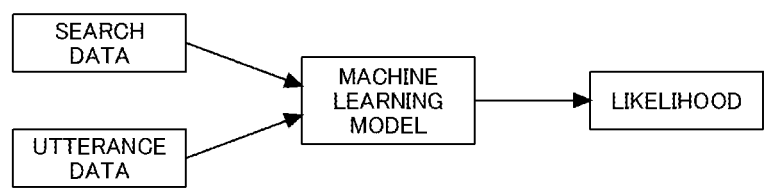
FIG. 4 is a diagram illustrating an outline of machine learning.

Next, an outline of the server 10 according to the present embodiment will be described with reference to FIGS. 3 and 4. FIGS. 3 and 4 are diagrams illustrating outlines of machine learning. The server 10 according to the present embodiment constructs a machine learning model (hereinafter also referred to as a likelihood calculation model) with data indicating actual performance of having provided services (hereinafter also referred to as actual performance data) as teacher data, and calculates likelihood of the user going out, using the likelihood calculation model. The actual performance data is data indicating actual performance of the user going out and includes, for example, departure times, destinations, movement routes and means of transportation used.

The likelihood calculation model uses data inputted by the user's intention and data inputted not by the user's intention as data for performing calculation of likelihood. Note that general data such as data of weather and a time zone may be further used. The data inputted by the user's intention is, for example, data inputted when the user uses a terminal or the like. Hereinafter, this data will be also referred to as search data. The data inputted not by the user's intention is, for example, data about an utterance of the user acquired by the microphone 34. Hereinafter, this data will be also referred to as utterance data.

The search data is, for example, such that indicates characteristics when the user inputs characters, voice or the like to the user terminal 20. Note that information obtained as a result of the user inputting the characters, voice or the like to the user terminal 20 can be included in the search data. These characteristics include, for example, one or more among a destination, departure time, a movement route and transportation means to be used, which are inputted in route search. Further, these characteristics may be a place of a restaurant, a time for use and an available number of people of the restaurant when the user searches for the restaurant. Further, these characteristics may be a place and time inputted in order for the user to check weather. These characteristics are acquired when the user uses a predetermined application installed in the user terminal 20. For example, if the user inputs a departure place, a destination and time to the application and obtains information about a movement route and available transportation means as a search result, the information about the movement route and the transportation means is also included in the search data.

The utterance data is, for example, such that indicates characteristics when the smart speaker 30 acquires an utterance of the user. The characteristics may be, for example, one or more among a destination, departure time, a movement route and transportation means to be used at the time of movement, or a place of a restaurant, business hours and an available number of people, or a place and time when weather is searched for. The utterance data is, for example, information included in voice inputted to the smart speaker 30 when the user is having a conversation with another user. For example, if there are "an utterance about going out", "an utterance about a place", "an utterance about time", "an utterance about a movement route" and "an utterance about transportation means" within a predetermined time (for example, thirty seconds, one minute, three minutes, five minutes, ten minutes or the like), it is thought that the user will go out. In this case, it can be estimated that the user will go out by "the utterance about going out"; an destination of the user can be estimated by "the utterance about a place"; time when the user departs can be estimated by "the utterance about time"; a movement route of the user can be estimated by "the utterance about a movement route"; and transportation means to be used by the user can be estimated by "the utterance about transportation means".

Note that, if a keyword related to the user going out is included in an utterance of the user, it is thought that "the utterance about going out" exists. The keyword in this case is, for example, "leave home", "depart", "go out", "go", "get in a car" or the like. Further, if a keyword related to a place is included in an utterance of the user, it is thought that "the utterance about a place" exists. The keyword in this case is, for example, a facility name, an area name, a station name, a sightseeing spot, a city, town or village name or the like. Further, if a keyword related to time is included in an utterance of the user, it is thought that "the utterance about time" exists. The keyword in this case is, for example, "seven in the morning" or the like. Further, if a keyword related to a movement route is included in an utterance of the user, it is thought that "the utterance about a movement route" exists. The keyword in this case is, for example, a service area name, a station name, a bus stop name or the like. Further, if a keyword related to transportation means is included in an utterance of the user, it is thought that "the utterance about transportation means" exists. The keyword in this case is, for example, "a car", "a train", "a bus", "an airplane", "a taxi", "a bicycle", "a ship" or the like. These keywords may be specified in advance or may be obtained by performing machine learning for each user. Further, it is not necessary to include all the above utterances. For example, if the utterance about going out and the utterance about time exist, it is possible to judge that the user goes out at that time. The search data and utterance data described above are converted to feature values and used as explanatory variables.

The server 10 constructs a model for calculating likelihood of the user going out, using a machine learning algorithm and calculates the likelihood using the model. For example, a machine learning model is constructed using actual performance data obtained for each user, and likelihood for each user is calculated. In the case of a different user, likelihood of the user going out may differ for content of an input and content of an utterance to the user terminal 20 and the smart speaker 30. Therefore, learning may be performed for each user. At the time of acquiring utterance data, a user may be identified, for example, based on voice. At the time of acquiring search data, a user may be identified, for example, on an assumption that an owner of the user terminal 20 is performing input.

(Functional Configuration: Server)

Figure 5:
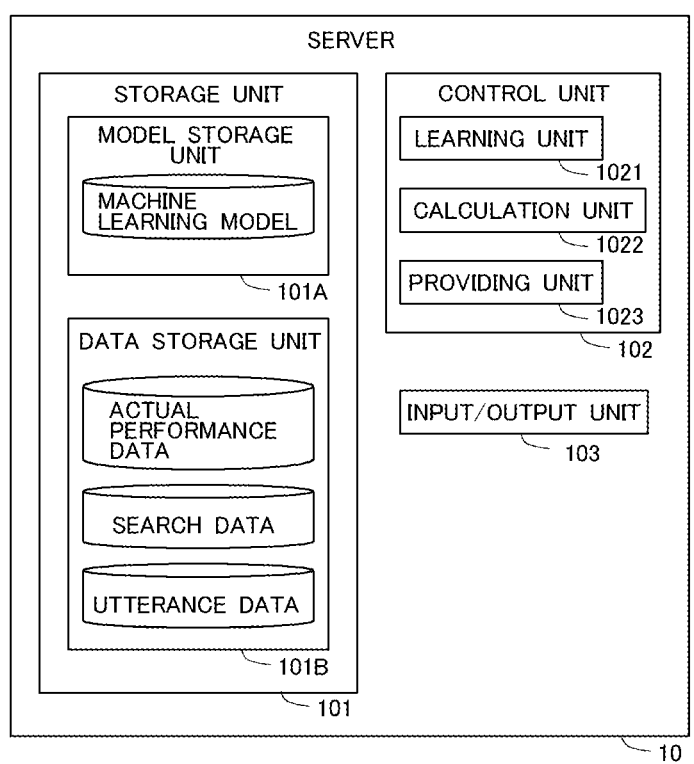
FIG. 5 is a diagram illustrating an example of a functional configuration of the server.

FIG. 5 is a diagram illustrating an example of a functional configuration of the server 10. The server 10 includes a storage unit 101, a control unit 102 and an input/output unit 103 as functional components.

The storage unit 101 stores data required to calculate likelihood. Specifically, the storage unit 101 is configured, including a model storage unit 101A that stores a machine learning model and a data storage unit 101B that stores data for performing machine learning. Note that the storage unit 101 can also store a program to be executed by the control unit 102 described later, and data and the like to be used by the program.

The model storage unit 101A stores a machine learning model (a likelihood calculation model). The likelihood calculation model is a model constructed with feature values to be a background of likelihood calculation as input data, and with feature values obtained by converting actual performance data as teacher data. The server 10 can execute a phase of performing leaning of the likelihood calculation model and a phase of performing likelihood calculation using the likelihood calculation model. The likelihood calculation model is a model that has been learned by actual performance data that has occurred for each user. The likelihood is a number between 0 to 1; and 0 and 1 correspond to a case where the user certainly does not go out and a case where the user certainly goes out, respectively.

The data storage unit 101B is databases that store the actual performance data, the search data and the utterance data. These databases are constructed by a database management system (DBMS) program executed by the processor 11 managing data stored in the auxiliary storage unit 13. The databases used in the present embodiment are, for example, relational databases. The data storage unit 101B can also store a different set of data for each target user.

As data for performing machine learning, the actual performance data, search data and utterance data as described above exist. These data may be acquired from outside the server 10 via a storage medium or a network.

Figure 6:
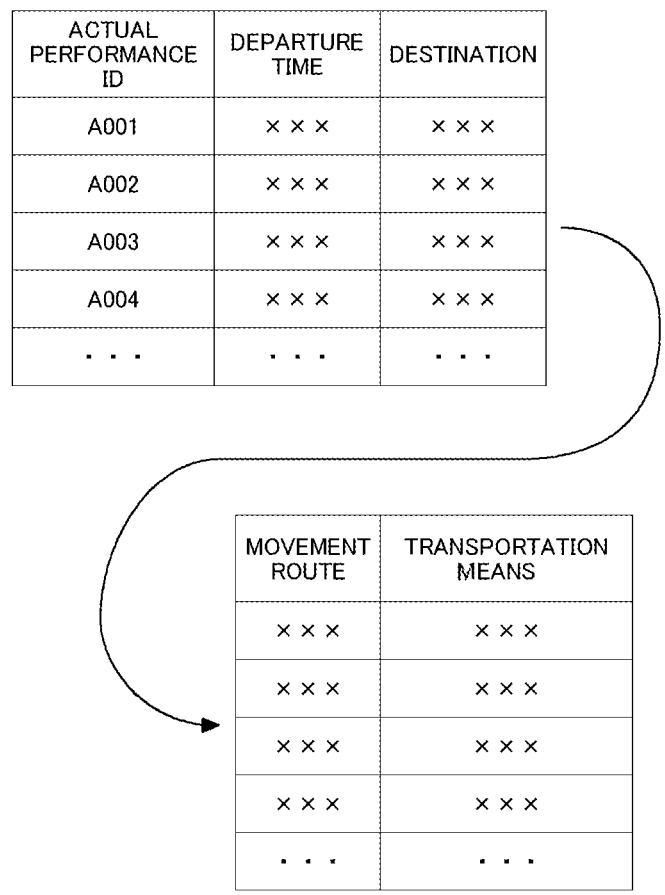
FIG. 6 illustrates an example of actual performance data.

The actual performance data is data indicating actual performance of the user going out using a vehicle (a taxi). FIG. 6 illustrates an example of the actual performance data. The actual performance data is, for example, such that indicates departure times, destinations, movement routes and used transportation means by numerical values when the user actually goes out. The used transportation means is, for example, transportation means that the user used after moving from home in a taxi. These data are generated based on information that the user inputs to the user terminal 20 or the smart speaker 30, position information about the user terminal 20 and the like.

Figure 7:
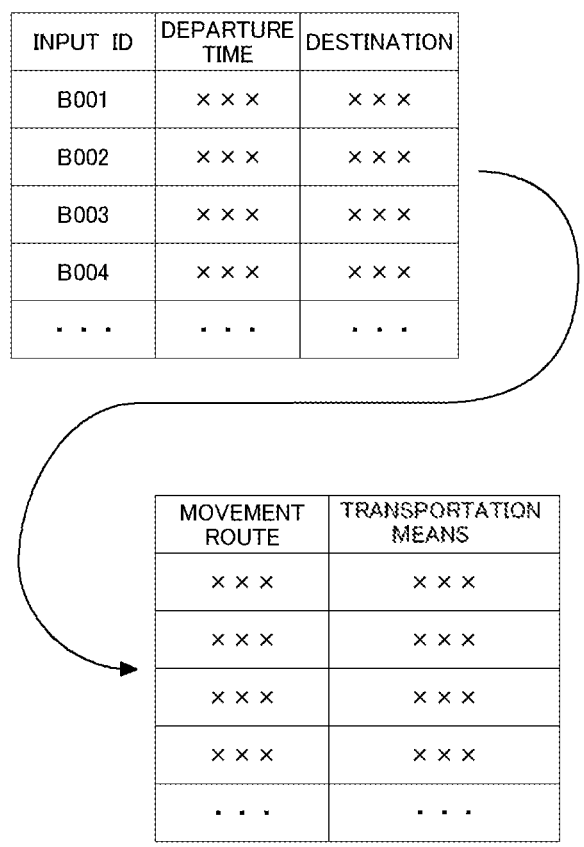
FIG. 7 illustrates an example of acquired data.

The search data is data indicating characteristics about input to the user terminal 20. FIG. 7 illustrates an example of the search data. The search data is, for example, departure time and a destination that the user inputs to the user terminal 20 when the user performs route search using the user terminal 20, and a movement route and transportation means obtained as a result of the search that are indicated by numerical values.

Figure 8:
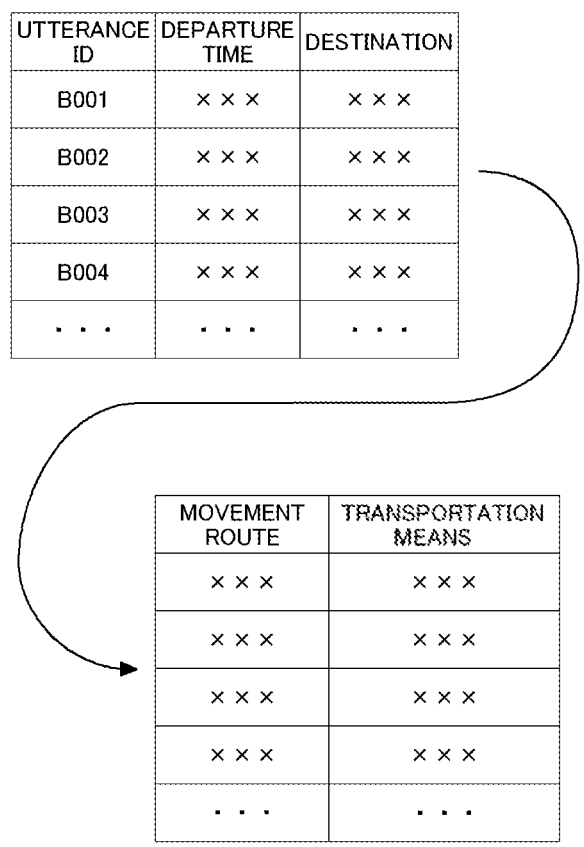
FIG. 8 illustrates an example of utterance data.

The utterance data is data indicating characteristics about an utterance of the user that the smart speaker 30 acquired. FIG. 8 illustrates an example of the utterance data. The utterance data is, for example, such that indicates, if keywords related to going out are included in a conversation of the user acquired by the smart speaker 30, the keywords by numerical values.

Note that, in description below, feature values obtained by converting the actual performance data, feature values obtained by converting the search data, and feature values obtained by converting the utterance data will be referred to as actual performance feature values, search feature values and utterance feature values, respectively.

The control unit 102 and the input/output unit 103 are arithmetic operation devices that perform functions the server 10 has. The control unit 102 is, for example, a functional component provided by the processor 11 of the server 10 executing the various kinds of programs stored in the auxiliary storage unit 13. The control unit 102 is configured having three function modules of a learning unit 1021, a calculation unit 1022, a providing unit 1023.

The learning unit 1021 constructs a likelihood calculation model corresponding to each user using a data set stored in the data storage unit 101B. For example, the learning unit 1021 converts the actual performance data, the search data and the utterance data corresponding to a particular user to feature values and constructs a likelihood calculation model corresponding to the particular user. The particular user can be switched.

The calculation unit 1022 performs calculation of likelihood of a user going out, using the constructed likelihood calculation model. Specifically, a likelihood calculation model corresponding to a user for whom calculation of likelihood is to be performed is selected; feature values (for example, search feature values or utterance feature values) to be an assumption for calculation of likelihood are inputted to the likelihood calculation model; and it is judged whether likelihood under a corresponding situation is high or low, based on an obtained result.

The providing unit 1023 provides a service corresponding to the likelihood. For example, if the likelihood is equal to or above a threshold, the providing unit 1023 performs arrangement of a taxi so that the taxi arrives at corresponding departure time. The arrangement of the taxi is performed, for example, via a server of an operator managing the taxi. Therefore, the providing unit 1023 transmits information about the user's name and address, time of visit for pickup and the like to the server of the operator via the input/output unit 103. Further, for example, when the taxi is arranged, the user is notified of the taxi having been arranged by transmitting a signal to that effect to the user terminal 20 or the smart speaker 30 from the input/output unit 103. Note that the notification to the user is not essential. Further, for example, if the user does not depart even when the departure time comes (for example, when the position information about the user terminal 20 does not change), reservation of the taxi arranged for the user may be cancelled.

Figure 9:
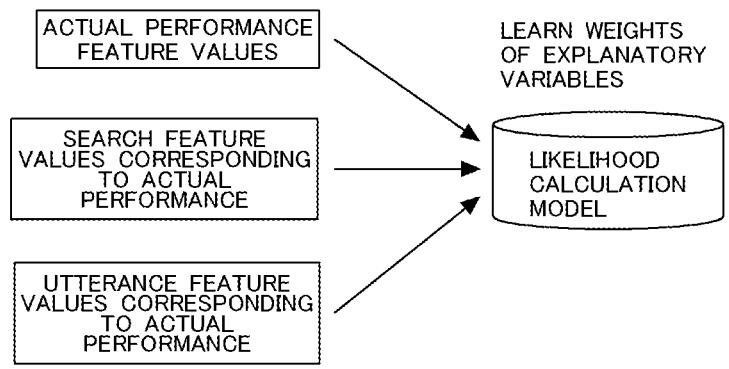
FIG. 9 is a diagram illustrating an outline of a likelihood calculation model construction process (a learning phase)
Figure 10:
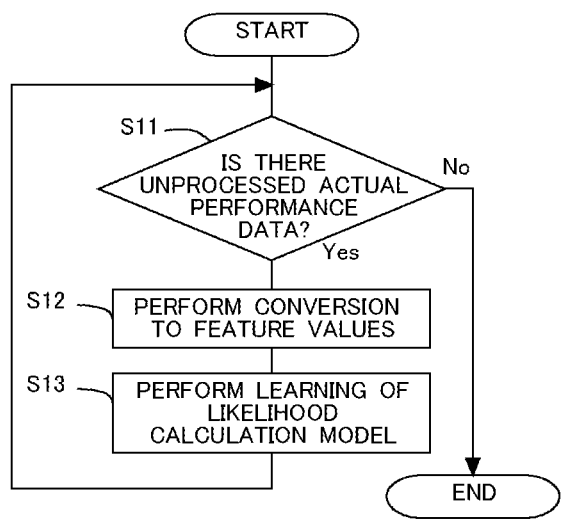
FIG. 10 is a flowchart of the likelihood calculation model construction process (the learning phase)

Next, specific content of a process performed by each function module will be described. First, a method of construction of a model performed by the learning unit 1021 will be described. FIG. 9 is a diagram illustrating an outline of a likelihood calculation model construction process (a learning phase); and FIG. 10 is a flowchart of the process.

On the learning phase, the learning unit 1021 performs learning of a likelihood calculation model using actual performance feature values, and search feature values and utterance feature values corresponding to the actual performance feature values. Here, it is assumed that there is actual performance of providing a dispatch service, and related data (the actual performance data, the search data and the utterance data) is stored in the data storage unit 101B.

First, the learning unit 1021 judges whether there is data that is not used for learning, among the stored actual performance data (step S11). Here, if all the actual performance data has been processed, the process ends. Otherwise, the process transitions to step S12.

At step S12, a processing target record among the actual performance data is converted to an actual performance feature value, and a record of search data corresponding to the actual performance and a record of utterance data corresponding to the actual performance are converted to a search feature value and an utterance feature value, respectively.

Then, at step S13, learning of the likelihood calculation model is performed, using these feature values. The search feature value and the utterance feature value become explanatory variables, and the actual performance feature value becomes an objective variable. By repeating this for all actual performance records, weights of the explanatory variables relative to the objective variables are updated.

Figure 11:
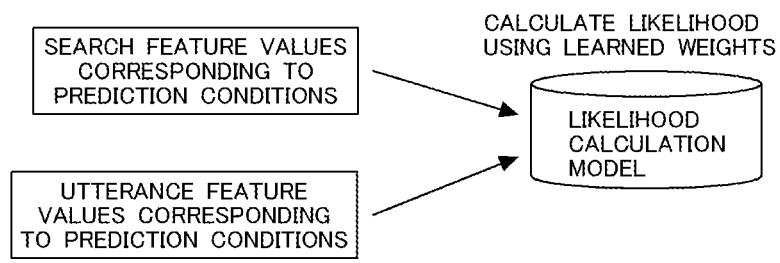
FIG. 11 is a diagram illustrating an outline of a process for calculating likelihood (a likelihood calculation phase)
Figure 12:
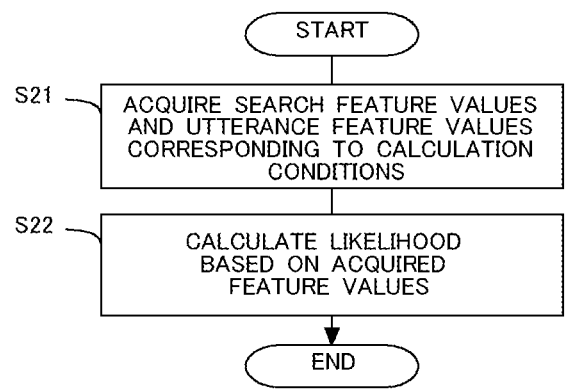
FIG. 12 is a flowchart of the process for calculating likelihood (the likelihood calculation phase)

Next, a method for calculation of likelihood performed by the calculation unit 1022 will be described. FIG. 11 is a diagram illustrating an outline of a process for calculating likelihood (a likelihood calculation phase); and FIG. 12 is a flowchart of the process. On the likelihood calculation phase, the calculation unit 1022 performs calculation of likelihood using search feature values and utterance feature values corresponding to conditions for performing calculation of likelihood (calculation conditions). Here, it is assumed that the search feature values and the utterance feature values corresponding to the calculation conditions are prepared in advance.

First, the calculation unit 1022 acquires the search feature values and the utterance feature values corresponding to the calculation conditions (step S21). For conversion to feature values, the same method as the method at the time of learning can be used. Then, the acquired feature values are inputted to the likelihood calculation model, and an obtained output is acquired as data about likelihood (step S22).

Figure 13:
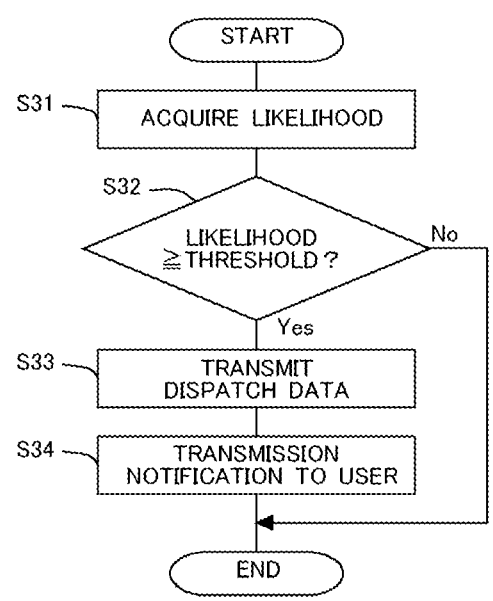
FIG. 13 is a flowchart of a process for providing a service.

Next, a process performed by the providing unit 1023 will be described. FIG. 13 is a flowchart of a process for providing a service. Here, it is assumed that actual performance data about users is accumulated in the data storage unit 101B, and a likelihood calculation model constructed using the actual performance data is stored in the model storage unit 101A. The present routine is executed each time likelihood is calculated for each user.

First, the providing unit 1023 acquires the calculated likelihood (a process of step S31) and judges whether the likelihood is equal to or above a threshold (step S32). The threshold is set as a threshold for the user going out. The threshold may be a fixed value set in advance. Further, the threshold may be different for each user. If a positive judgment is made at step S32, the process proceeds to step S33. If a negative judgment is made, the present routine is ended.

At step S33, information required for visit for pickup such as the user's departure time and address is transmitted, for example, to the server of the operator. Note that this information may be transmitted not via the server of the operator but directly to a taxi. Further, for a vehicle capable of autonomous traveling, an operation instruction for visit for pickup may be generated, and the operation instruction may be transmitted to the vehicle. Next, at step S34, a notification to the user is transmitted. Here, information indicating that a taxi has been dispatched is transmitted to the user terminal 20. By this information, for example, a screen indicating that the taxi has been dispatched is displayed on the user terminal 20. Further, for example, the smart speaker 30 which has received the information indicating dispatch has been performed makes a notification by voice.

Figure 14:
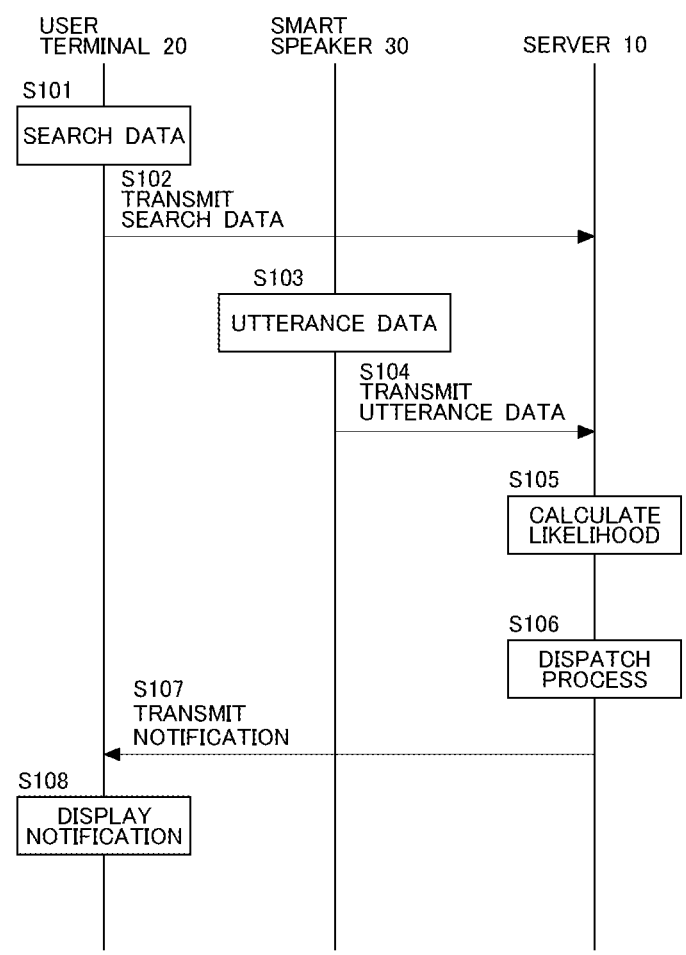
FIG. 14 is a sequence diagram of a process of the dispatch system according to the embodiment.

FIG. 14 is a sequence diagram of a process of the dispatch system 1 according to the present embodiment. The sequence diagram according to FIG. 14 assumes that dispatch is performed for the user. Further, it is assumed that a notification indicating that dispatch has been performed for the user is transmitted to the user terminal 20. Further, it is assumed that a machine learning model is stored in the model storage unit 101A.

When search data is inputted to the user terminal 20 (S101), the search data is transmitted to the server 10 from the user terminal 20. Further, when utterance data is inputted to the smart speaker 30 (S103), the utterance data is transmitted to the server 10 from the smart speaker 30 (S104). In the server 10 which has received the search data and the utterance data, likelihood is calculated based on the machine learning model stored in the model storage unit 101A (S105). When the likelihood is calculated, the routine illustrated in FIG. 13 is executed, and dispatch is performed for the user (S106). At this time, information about the dispatch may be generated and transmitted to the server of the taxi operator. Further, a notification indicating that dispatch has been performed is transmitted to the user terminal 20 (S107), and the notification is displayed on the output unit 25 of the user terminal 20.

By the providing unit 1023 executing the process described above, a taxi is arranged by the providing unit 1023 even though the user does not arrange a taxi himself. In other words, since the user can get in a taxi without arranging the taxi himself at the time of going out, movement becomes easy for the user. Further, if the likelihood is below the threshold, a taxi is not arranged, and, therefore, it is possible to prevent a taxi from being arranged when it is not needed. Further, by collecting information from a plurality of apparatuses (for example, the user terminal 20 and the smart speaker 30), it is possible to calculate the likelihood of the user going out more accurately.

(Modification)

Though likelihood of a user going out is calculated using machine learning in the above embodiment, the likelihood of the user going out may be calculated not by machine learning. For example, behavior of the user and likelihood may be associated with each other in advance. For example, if the user inputs a departure place, a destination, departure time and the like when he searches for a route using the user terminal 20, it may be assumed that the user goes out to the destination at the time with a predetermined likelihood equal to or above a threshold. Further, the likelihood may be calculated so as to be higher as a date and time when route search is performed is closer to a movement date and time inputted at the time of route search. For example, when route search is performed, specifying the next day, likelihood of the user going out the next day may be thought to be a predetermined likelihood equal to or above the threshold.

Further, at the time of calculating likelihood, weighting may be performed so that the likelihood is higher for information obtained from content that the user has inputted to the user terminal 20 himself than for information obtained from content of an utterance of the user acquired by the smart speaker 30. Since jokes and desires are included in a conversation between the user and another user, there may be a case where the user does not go out even if information about going out is included in the conversation. On the other hand, when the user searches for a movement route himself, the user often searches as preparation for actually going out. Therefore, a possibility of the user going out is high. Therefore, information obtained when the user performs route search using the user terminal 20 can be said to have a high relationship with the user's going out than information included in an utterance of the user obtained by the microphone 34 of the smart speaker 30. Therefore, a weight on information about content that the user has searched for himself may be set larger. For example, in the case of calculating likelihood not by machine learning, a contribution rate of search data to the likelihood may be set higher than a contribution rate of utterance data to the likelihood even if a destination, departure time, a movement route and transportation means are the same between the search data and the utterance data.

Further, for example, likelihood corresponding to a plurality of users may be determined in advance and corrected according to attributes of each user at the time of applying the likelihood to the user. The likelihood corresponding to a plurality of users may be average likelihood for behaviors of the plurality of users in the past. The attributes of each user may be related to tastes, sex, race, age, area of residence or family structure of the user. Further, the attributes of each user may be what the user inputs to the user terminal 20 himself or may be values learned from past search data and utterance data.

Further, for example, if the user retrieves a restaurant from the user terminal 20 or the smart speaker 30, it may be judged that likelihood of the user going out to visit the restaurant on coming weekend is a predetermined likelihood. In this case, it may be detected in advance by the position information about the user terminal 20 that the user has a tendency to go out on weekends.

Further, for example, if the user reserves a restaurant, a hotel or transportation means from the user terminal 20 or the smart speaker 30, it may be judged that likelihood of the user going out according to the reservation is a predetermined likelihood equal to or above the threshold. In other words, if a restaurant or the like is reserved by the user, probability of the user going out is thought to be very high, and, therefore, likelihood is calculated so that a vehicle is arranged.

Further, for example, if the user searches for weather of a certain date and time, it may be judged that likelihood of going out on that date and time is a predetermined likelihood equal to or above the threshold. If the user searches for weather of a certain date and time in a certain place, it may be judged that likelihood of going out to the place on that date and time is a predetermined likelihood equal to or above the threshold.

Further, if calculated likelihood is below the threshold, an inquiry about whether the user goes out or not may be made to the user. For example, when the likelihood is below the threshold, the providing unit 1023 may obtain an answer from the user by causing a screen for inquiring of the user whether he goes out or not to be displayed on the user terminal 20 or outputting voice for inquiry from the smart speaker 30. The inquiry may be an inquiry about whether a vehicle such as a taxi may be arranged or not, in addition to the inquiry about whether the user goes out or not. A device that outputs the inquiry may be changed according to likelihood. For example, since information obtained from an utterance of the user may be a mere joke or desire, it may be sufficient only to display an inquiry on the user terminal 20 assuming that necessity of inquiry is low. In this case, even if the user fails to notice the inquiry, it often does not matter because a possibility of the user going out is low. On the other hand, as for information obtained by the user inputting characters and the like to the user terminal 20, there is a high possibility that the user is performing route search for preparation of going out. Therefore, an inquiry by voice from the smart speaker 30 may be made to inquire of the user more certainly.

Further, even if calculated likelihood is equal to or above the threshold, an inquiry about whether the user goes out or not may be made to the user. Since it is conceivable that the user does not go out even if the likelihood is high, it is possible to, for example, prevent a taxi from being uselessly dispatched by inquiring of the user whether he goes out or not.

Figure 15:
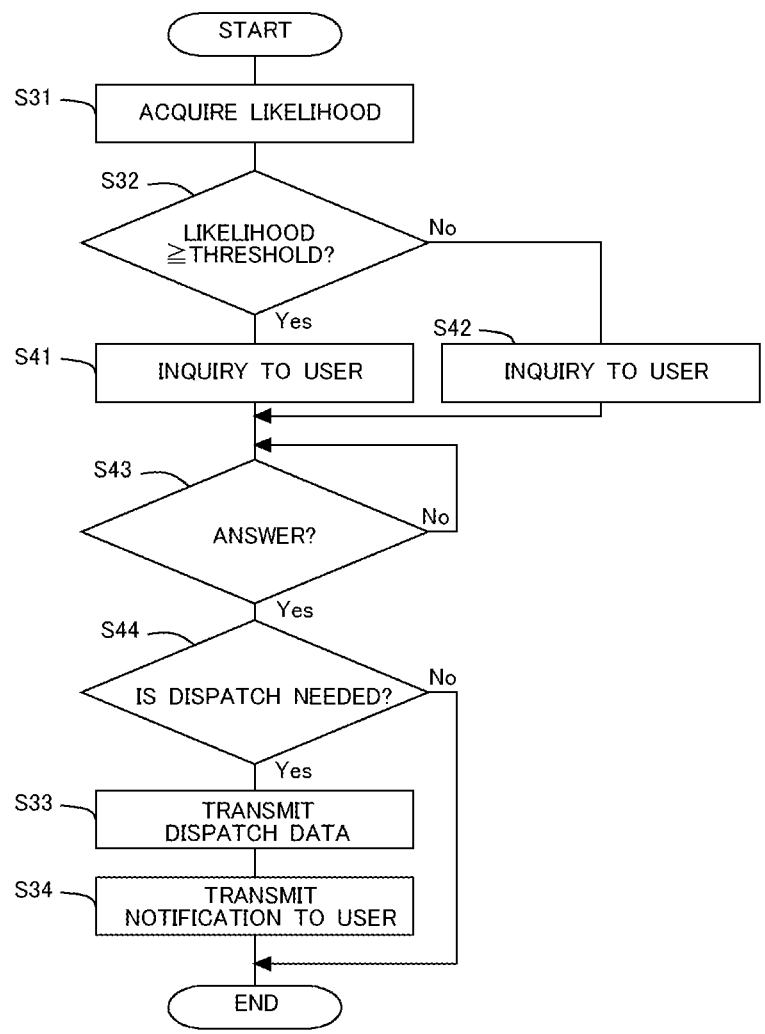
FIG. 15 is a flowchart of a process for providing a service.

FIG. 15 is a flowchart of a process for providing a service in the case of inquiring of the user before dispatch. The process illustrated in FIG. 15 is executed by the providing unit 1023. In FIG. 15, steps where the same processes of the flowchart illustrated in FIG. 13 are executed will be given the same reference numerals, and description will be omitted.

In the flowchart illustrated in FIG. 15, if a positive judgment is made at step S32, the process proceeds to step S41, where information for inquiring whether dispatch may be performed on a date and time when dispatch is scheduled is transmitted to the user terminal 20 or the smart speaker 30. At this time, information for inquiring whether the dispatch date and time is correct or not may be further transmitted. On the other hand, if a negative judgment is made at step S32, the process proceeds to step S42, where information for inquiring whether dispatch is needed or not is transmitted. Then, at step S43, it is judged whether or not an answer to the inquiry has been received from the user terminal 20 or the smart speaker 30. If the answer has been received, the process proceeds to step S44. Then, at step S44, if the answer is an answer that dispatch is needed, the process proceeds to step S33, where information required for visit for pickup is transmitted, for example, to the server of the operator. On the other hand, if a negative judgment is made at step S44, the present routine is caused to end.

Note that, in the case of making an inquiry about dispatch to such a user that a plurality of smart speakers 30 are arranged at home, a smart speaker 30 by which the inquiry is made may be changed according to likelihood. For example, if the likelihood is high, the inquiry may be transmitted to a smart speaker 30 arranged at a place where a possibility of being recognized by the user is high; and, if the likelihood is low, the inquiry may be transmitted to a smart speaker 30 arranged at a place where the possibility of being recognized by the user is low. This process is executed at step S42 described above. The relationship between the smart speaker 30 targeted by transmission of the inquiry and the likelihood may be set by the user. The server 10 may grasp such a smart speaker 30 that a possibility of the user recognizing the smart speaker 30 is high or such a smart speaker 30 that the possibility of the user recognizing the smart speaker 30 is low, by performing machine learning. Further, the user may set a likelihood threshold for performing dispatch or an inquiry.

Further, at S41 or S42, the smart speaker 30 by which the inquiry is made may be decided according to attributes of the user. Further, the inquiry may be made to any one of the user terminal 20 and the smart speaker 30 according to the attributes of the user. At this time, the inquiry may be made to a terminal the user likes. Further, a counterpart terminal to which the notification is transmitted at S34 may be decided according to the attributes of the user. At this time, the notification may be transmitted to a terminal the user likes.

In the above embodiment, whether or not to perform dispatch for the user is judged by using a threshold. In other words, a judgment is made by likelihoods classified in two stages. Likelihoods may be classified in three or more stages. For example, likelihoods are classified into three stages of a high likelihood which is the highest likelihood, a medium likelihood which is lower than the high likelihood and a low likelihood which is lower than the medium likelihood so that dispatch is performed without making an inquiry to the user if calculated likelihood is the high likelihood, an inquiry about dispatch may be made to the user in the case of the medium likelihood, and neither dispatch nor inquiry may be performed in the case of the low likelihood.

Though dispatch of a taxi has been mainly described in the above embodiment, the present disclosure is also applicable to a service of carrying a bicycle to home when the user rents the bicycle, and the like. Further, the service provided for the user can be changed according to an utterance of the user. For example, in the case of a user who has made an utterance about health, not a taxi but a bicycle may be arranged.

Further, even in the case of using a private car, a service can be provided. For example, if the private car is an electric car, it may be judged whether charging will have been completed at time when the user departs, and, if it is predicted that charging will not have been completed, the user may be notified to that effect. Further, for example, another user plans to use the private car at the time when the user departs, the user may be notified to that effect.

For example, when it is detected by a sensor provided in a refrigerator that food is insufficient, dispatch may be performed so that the user departs according to opening time of a nearby supermarket next day, and the user may be notified to that effect.

OTHER EMBODIMENTS

The above embodiment is a mere example, and the present disclosure can be appropriately changed and practiced within a range not departing from the spirit thereof.

The processes described in the present disclosure can be freely combined and implemented as far as technical contradiction does not occur.

A process described as being performed by one apparatus may be shared and executed by a plurality of apparatuses. Or alternatively, a process described as being performed by a different apparatus may be executed by one apparatus. By what hardware configuration (server configuration) each function is realized in a computer system can be flexibly changed.

The present disclosure can be realized by supplying a computer program implemented with the functions described in the above embodiment to a computer, and one or more processors that the computer has reading and executing the program. Such a computer program may be provided for the computer by a non-transitory computer-readable storage medium that can be connected to a system bus of the computer or may be provided for the computer via a network. The non-transitory computer-readable storage medium includes, for example, a disk of an arbitrary type such as a magnetic disk (a floppy (registered trademark) disk, a hard disk drive (HDD) and the like) and an optical disk (a CD-ROM, a DVD disk, a Blu-ray disk and the like), and a read-only memory (ROM), a random access memory (RAM), an EPROM, an EEPROM, a magnetic card, a flash memory, an optical card, and a medium of an arbitrary type that is appropriate for storing electronic commands.

What is claimed is:

1. An information processing apparatus comprising a processor, the processor being configured to execute:
    calculating, based on information about behavior of a user, likelihood about future movement of the user;
    outputting information about a service for the movement of the user based on the calculated likelihood;
    receiving search data comprising information that the user input to a user terminal when performing a route search using the user terminal;
    receiving utterance data comprising information uttered by the user indicating that the user intends to go out;
    applying a first weight to the search data to obtain weighted search data;
    applying a second weight to the utterance data to obtain weighted utterance data, wherein the first weight is greater than the second weight;
    using machine learning to calculate a likelihood that the user will go out based on the weighted search data and the weighted utterance data;
    determining whether the likelihood is equal to or greater than a predetermined threshold; and
    upon determination that the likelihood is equal to or greater than the predetermined threshold, causing a taxi to arrive at a location of the user and transmitting a signal to the user terminal to notify the user about the taxi.

2. The information processing apparatus according to claim 1, wherein, in the calculation of the likelihood, the processor calculates likelihood about one or more among a destination, a departure time, a transportation means to the destination and a route to the destination.

3. The information processing apparatus according to claim 1, wherein the information about the behavior of the user includes information acquired by a plurality of apparatuses.

4. The information processing apparatus according to claim 3, wherein the information acquired by the plurality of apparatuses includes information about a history of the user having searched using a terminal or information about an utterance of the user acquired by a microphone.

5. The information processing apparatus according to claim 4, wherein a weight on likelihood is larger for the information about the history that the user has searched using the terminal than for the information about the utterance of the user.

6. The information processing apparatus according to claim 3, wherein the information acquired by the plurality of apparatuses includes information about one or more among a destination, departure time, transportation means to the destination and a route to the destination.

7. The information processing apparatus according to claim 1, wherein the processor calculates the likelihood according to attributes of the user.

8. The information processing apparatus according to claim 1, wherein, in the output of the information about the service, the processor outputs information about arrangement of transportation means according to the calculated likelihood.

9. The information processing apparatus according to claim 8, wherein the processor decides a terminal of the user that is caused to output the information about the arrangement of the transportation means, according to the calculated likelihood.

10. The information processing apparatus according to claim 8, wherein the processor decides a terminal of the user that is caused to output the information about the arrangement of the transportation means, according to attributes of the user.

11. The information processing apparatus according to claim 8, wherein, in the output of the information about the arrangement of the transportation means, the processor outputs information about arrangement of a vehicle.

12. The information processing apparatus according to claim 8, wherein, in the output of the information about the arrangement of the transportation means, the processor outputs information for arranging the transportation means and outputs information for notifying the user that the transportation means has been arranged if the calculated likelihood is equal to or above a first threshold.

13. The information processing apparatus according to claim 8, wherein, in the output of the information about the arrangement of the transportation means, the processor outputs information for confirming whether or not to perform the arrangement of the transportation means, to a terminal of the user.

14. The information processing apparatus according to claim 8, wherein, in the output of the information about the arrangement of the transportation means, the processor outputs the information for confirming whether or not to perform the arrangement of the transportation means, to a terminal of the user if the calculated likelihood is below a second threshold.

15. The information processing apparatus according to claim 13, wherein the processor decides the terminal of the user to which the information for confirming whether or not to perform the arrangement of the transportation means is outputted, according to the calculated likelihood.

16. The information processing apparatus according to claim 13, wherein the processor decides the terminal of the user to which the information for confirming whether or not to perform the arrangement of the transportation means is outputted, according to attributes of the user.

17. An information processing method, wherein a computer executes:
- calculating, based on information about behavior of a user, likelihood about future movement of the user;
- outputting information about a service for the movement of the user based on the calculated likelihood;
- receiving search data comprising information that the user input to a user terminal when performing a route search using the user terminal;
- receiving utterance data comprising information uttered by the user indicating that the user intends to go out;
- applying a first weight to the search data to obtain weighted search data;
- applying a second weight to the utterance data to obtain weighted utterance data, wherein the first weight is greater than the second weight;
- using machine learning to calculate a likelihood that the user will go out based on the weighted search data and the weighted utterance data;
- determining whether the likelihood is equal to or greater than a predetermined threshold; and
- upon determination that the likelihood is equal to or greater than the predetermined threshold, causing a taxi to arrive at a location of the user and transmitting a signal to the user terminal to notify the user about the taxi.

18. The information processing method according to claim 17, wherein the information about the behavior of the user includes information acquired by a plurality of apparatuses.

19. A system comprising:
- a user terminal configured to detect behavior of a user;
- an information processing apparatus comprising a processor, the processor being configured to execute:
  - calculating, based on the behavior of the user detected by the user terminal, likelihood about future movement of the user;
  - outputting information about a service for the movement of the user based on the calculated likelihood;
  - receiving search data comprising information that the user input to a user terminal when performing a route search using the user terminal;
  - receiving utterance data comprising information uttered by the user indicating that the user intends to go out;
  - applying a first weight to the search data to obtain weighted search data;
  - applying a second weight to the utterance data to obtain weighted utterance data, wherein the first weight is greater than the second weight;
  - using machine learning to calculate a likelihood that the user will go out based on the weighted search data and the weighted utterance data;
  - determining whether the likelihood is equal to or greater than a predetermined threshold; and
  - upon determination that the likelihood is equal to or greater than the predetermined threshold, causing a taxi to arrive at a location of the user and transmitting a signal to the user terminal to notify the user about the taxi; and
- the user terminal being further configured to output a notification based on the information about the service outputted by the processor, to the user.

20. The system according to claim 19, comprising a plurality of the input apparatuses.

* * * * *